July 5, 1955  J. A. SKUPAS  2,712,366
TRUCK LOCK
Filed July 7, 1951
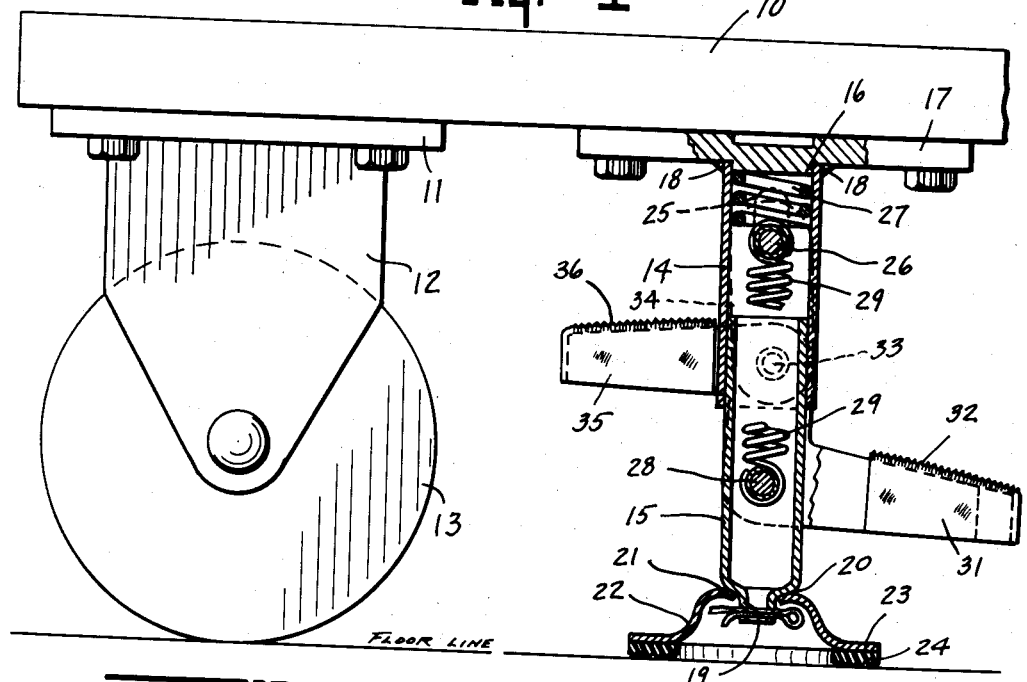
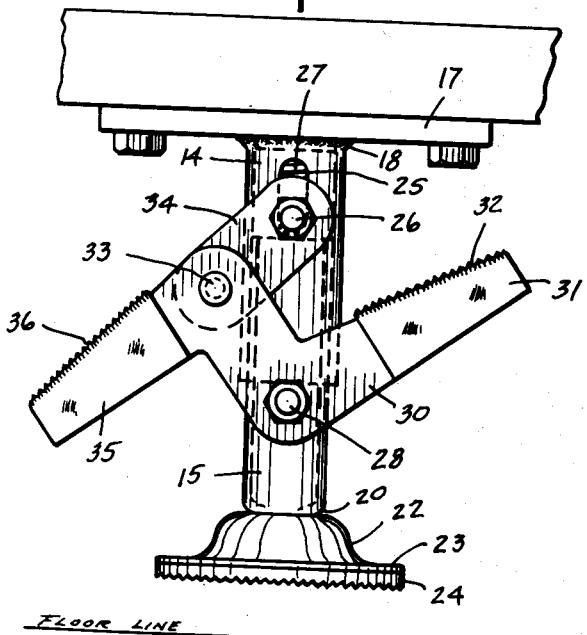
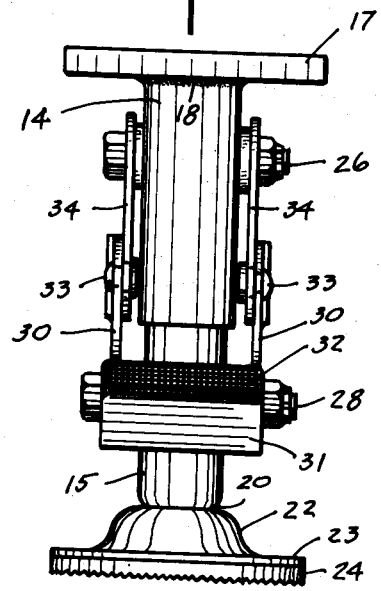
INVENTOR.
JOHN A. SKUPAS.
BY
Lockwood, Hahn, Galt & Woodard,
ATTORNEYS.

United States Patent Office 2,712,366
Patented July 5, 1955

2,712,366
TRUCK LOCK

John A. Skupas, Evansville, Ind., assignor to Faultless Caster Corporation, Evansville, Ind., a corporation Application July 7, 1951, Serial No. 235,632

4 Claims. (Cl. 188—5)

This invention relates to a truck lock for application to wheel or caster trucks generally used in inter-factory hauling, the truck lock being of a type for frictional floor engagement.

Truck locks of this general character and purpose have heretofore been commonly employed, it being the purpose of this invention to improve thereon. One feature of the invention, therefore, resides in the manipulating leverage for applying and releasing the lock having dual reverse pedals so arranged that the lock may be both applied and released by a direct downward push of the foot applied to a selected one of two pedals. Thus, in either case the operator need merely step on a selected one or the other pedal to either apply the lock or release it, the applying or releasing force being transmitted through the sole of the shoe to an embossed non-skid tread on the pedal. This is accomplished through a single leverage structure extending on opposite sides of the truck lock with opposed outwardly extending arms on which the pedals are mounted, and wherein the mounting of the lever provides a stop for limiting its movement to its applied or released positions.

Another feature of the invention resides in the mounting of the truck lock to the underside of the truck bed through a suitable mounting plate, and wherein the mounting plate is provided with a non-shear boss extending downwardly into the truck lock for centering it upon the plate and resisting transverse shearing action therebetween.

A further feature of the invention resides in the self-aligning universal support of the floor engaging foot piece with respect to the supporting standard, wherein the foot piece is formed with a dished saddle portion centrally thereof for rockably and rotatably receiving a reduced shoulder portion of the standard, the foot boss being provided with an anti-skid gripping ring such as to conform to irregular floor surfaces in conjunction with the universal mounting of the foot piece on the standard.

A further feature of the invention resides in the provision of a compression cushion spring interposed between the mounting plate which provides for self adjustment of the truck lock to variable distances between the plate and the floor surface due to irregularities of conditions while in operation.

Another advantage of the structure as herein disclosed lies in its arrangement whereby the truck lock may be readily disassembled and reassembled in case of spring breakage and replacement.

The full nature of the invention will be understood from the accompanying drawing and the following description and claims:

Fig. 1 is a side elevation showing a portion of a truck with the truck lock shown in partial vertical section and in applied position.

Fig. 2 is a side elevation of the truck lock in released position.

Fig. 3 is a front elevation of the truck lock shown in Fig. 1.

In the drawing there is shown a portion of a truck having a truck bed 10 to which there is mounted the usual four wheels or casters, each caster having a mounting plate 11, caster horns or supports 12, and a caster wheel 13 normally adapted to roll over the floor or ground.

The truck lock is secured to the underside of the truck bed to extend downwardly in a position to engage and grip the surface of the floor or ground when applied, or be moved upwardly free therefrom when released. Thus, when applied the truck lock relieves the wheel or caster 13 as the truck support and by frictionally engaging the floor surface locks the truck against movement.

The truck lock as herein shown, consists of a standard comprising telescoping tubes, there being an upper outer tube 14 and a lower inner tube 15 having their adjacent ends arranged in telescopic relation. The upper tube 14 fits securely over a downwardly extending annular boss 16 formed from the underside of the mounting plate 17, which in turn is secured to the underside of the truck bed 10. Said tube is secured about the boss by the welds indicated at 18. Through the medium of the boss 16 extending with a close fit into the upper end of the tube 14, said tube is thereby centered on the plate and greatly strengthened relative thereto with respect to a shearing action.

The lower end of the standard or lower tube 15 terminates in a reduced nipple 19 having a downwardly and inwardly sloping shoulder 20 bearing upon an inwardly curved saddle portion 21 of the foot piece 22. The saddle portion of the foot piece flares outwardly to provide the flanged supports 23 to the underside of which there is secured a friction ring or disc 24 embossed on its under surface with an anti-skid tread. By reason of this construction the anti-skid ring 24 will conform to an uneven floor or ground surface and resist displacement thereon when the lock is applied. By reason of the ball and socket mounting of the foot piece 22 on the lower end of the tube 15 through the mating curvatures of the shoulder 20 and saddle 21, the foot piece may rock relative thereto within the desired limits and freely rotate thereon to further provide for uneven floor or ground surfaces.

The upper portion of the outer tube 14 is provided with opposed elongated slots 25 which receive a transverse upper supporting bolt 26, said bolt riding in the slot and being secured therein by suitable lock nuts. A heavy compression spring 27 is embraced within said tube between the bolt 26 and the boss 16, said spring normally maintaining the bolt at the lower end of the slot, but yieldingly permitting it to ride upwardly therein.

Rigidly secured transversely of the lower tube 15 there is a lower supporting bolt 28, said supporting bolts 26 and 28 being connected by a tension spring 29 extending through said tubes and tending to draw the tubes together under spring tension from the applied position of Fig. 1 to the released position of Fig. 2.

The control linkage comprises a pair of bell crank levers 30, fulcrumed intermediate their ends on the bolt 28 exteriorly of the tube 15. Secured to one of the actuating ends of said levers there is a foot pedal 31 having mounted on the upper face thereof a cross grooved anti-skid rubber pad 32. On the opposite side of the fulcrum mounting of said levers they are each pivotally connected at 33 with a pair of links 34 pivotally secured at their opposite ends to the upper supporting bolt 26. Each of the levers 30 is provided with an angular extension from the end thereof adjacent the pivotal connection 33, to which is secured a second foot pedal 35 having a non-skid tread 36 on the upper surface thereof, said second foot pedal being opposed to the pedal 31 and in offset parallel relation thereto.

Said linkage is so related that when the lock is moved to released position by the spring 29 (as shown in Fig. 2) the bell crank lever 30 is swung on links 34 to one side in collapsed relation limited by the bolt 28 striking the lower end of the upper tube 14. In this position the lock applying pedal 31 extends upwardly at an angle and the lock releasing pedal 35 extends downwardly at an angle. Upon the operator applying his foot to the tread 32 of the pedal 31 in its upward angular position, it is forced downwardly to a substantially horizontal position, as shown in Fig. 1. This movement carries the releasing pedal 35 to a substantially horizontal position and throws the pivotal connection 33 between the levers and links over center with the inner end of the pedal 35 bearing against the tube 14. The over center position of the pivotal connection 33 and the limited position of the pedal 35 holds the lock in its applied position, the relative movements of the levers and links having expanded the spring 29 and elongated the standard through the sliding telescopic action of the tubes. In this extended applied position the weight of the truck is carried from the lower tube through the bolt 28, levers 30, links 34 and bolt 26, the upper tube 14 serving merely as a guide. The bolt 26 in turn supports the truck bed through the compression spring 27 which may yield to provide for self adjustment of the lock to variable distance relation between the truck bed and floor line.

When it is desired to release the lock, the laterally-extending releasing pedal 35 is engaged by the foot and pressed downwardly, which carries the pivotal connection 33 back over center, whereupon the spring 29 contracts to draw the tube 15 upwardly into the tube 14 from the position shown in Fig. 1 to the position shown in Fig. 2.

The invention claimed is:

1. A truck lock for a wheel truck having a truck bed including a mounting plate secured to the underside of said bed, a downwardly extending boss formed integrally with said mounting plate, a telescopic standard comprising upper and lower relatively slidable tubular sections depending from said plate for locking ground engagement, means for securing the upper end of said upper section about said boss whereby said boss provides a centering reinforcement therefor against shearing and angular displacement, said upper section having an axially disposed elongated slot adjacent and in spaced relation with said boss, an anchor bolt extending through and movable within said slot, a cushion spring interposed between said anchor bolt and boss, a second anchor bolt extending through the lower tubular section, a tension spring connecting said bolts tending to telescope said sections, a bell crank lever fulcrumed intermediate its ends to said last-mentioned bolt, linkage connecting said lever with said first-mentioned bolt to provide a toggle assembly, a foot pedal mounted on each end of said lever and extending in opposite directions to opposite sides of said standard, one of said pedals being movable downwardly to swing said toggle assembly into aligned over center position, said downward movement being limited by engagement of said opposed pedal with said standard, and said opposed pedal being movable downwardly under foot pressure to swing said toggle assembly from over center position to collapsed position under the tension of said tension spring, said collapsed position being limited by engagement of said second-mentioned bolt with the upper tubular section, whereby said standard will be extended and retracted by the downward pressure exerted on said pedals, respectively, into and out of ground engaging locking position under tension of said cushion spring.

2. A truck lock for a wheel truck having a truck bed including a mounting plate secured to the underside of said bed, comprising a telescopic standard having upper and lower relatively slidable tubular sections depending from said plate for locking ground engagement, means for securing the upper end of said upper section to said mounting plate, the upper section having an axially disposed elongated slot adjacent and in spaced relation with said mounting plate, an anchor bolt extending through and movable within said slot, a cushion spring interposed between said anchor bolt and plate, a second anchor bolt extending through the lower section, a tension spring connecting said bolts tending to telescope said sections, a bell crank lever fulcrumed intermediate its ends to said last-mentioned bolt, linkage connecting said lever with said first-mentioned bolt to provide a toggle assembly, and a foot pedal mounted on each end of said lever and extending in opposite directions to opposite sides of said standard, one of said pedals being movable downwardly to swing said toggle assembly into aligned over center position, said opposed pedal lying in an offset parallel plane to said first pedal and movable downwardly under foot pressure to swing said toggle assembly from over said center position to collapsed position under the tension of said tension spring, said collapsed position being limited by engagement of said second-mentioned bolt with the upper tubular section, whereby said standard will be extended and retracted by the downward pressure exerted on said pedals, respectively, into and out of ground engaging locking position under tension of said cushion spring.

3. A truck lock for a wheel truck having a truck bed comprising a telescopic standard including upper and lower relatively slidable tubular sections depending from lower relatively slidable tubular sections depending from said bed for locking ground engagement, means for securing the upper end of the upper section to said bed, said upper section having an axially disposed elongated slot adjacent the upper end thereof, an anchor bolt extending through and movable within said slot, a cushion spring interposed between said anchor bolt and truck bed, a second anchor bolt extending through the lower tubular section, a tension spring connecting said bolts tending to telescope said sections, a bell crank lever fulcrumed intermediate its ends to said last-mentioned bolt, linkage connecting said lever with said first-mentioned bolt to provide a toggle assembly, and a pair of opposed foot pedals secured to said lever to extend in opposite directions and from opposite sides of said lever in offset substantially parallel planes, one of said pedals being movable downwardly to swing said toggle assembly into aligned over center position and said opposed pedal being movable downwardly to swing said toggle assembly from over center position to collapsed position under the tension of said tension spring, whereby said standard will be extended and retracted by the downward pressure exerted on said pedals, respectively, into and out of ground engaging locking position under tension of said cushion spring.

4. A truck lock for a wheel truck having a truck bed, a telescopic standard secured to the underside of said truck bed to extend downwardly therefrom, said standard comprising upper and lower relatively slidable tubular sections; the upper said section being secured to the underside of said truck bed, an anchor bolt extending through said upper section adjacent the upper end thereof, a second anchor bolt extending through the lower section, a tension spring connecting said bolts tending to telescope said sections, a bell crank lever fulcrumed intermediate its ends to said last-mentioned bolt, a link connecting one end of said lever with said first-mentioned bolt to provide a toggle assembly, a foot pedal secured to said last-mentioned end of said lever extending to one side of said standard in alignment with said link when in one position and at right angles to said link when in its other position, and a second foot pedal extending to the opposite side of said standard from the other end of said lever in offset parallel relation to said first-mentioned pedal, said last-mentioned pedal being movable downwardly to swing said toggle assembly into aligned over center position and said first-mentioned pedal being movable downwardly and said first-mentioned pedal being movable downwardly under foot pressure to swing said toggle assembly from over center position to collapsed position under the tension of said spring, whereby said standard will be extended and retracted by the downward pressure exerted on said pedals, respectively, into and out of ground engaging locking position.

References Cited in the file of this patent
UNITED STATES PATENTS

| | | |
|---|---|---|
| 2,132,467 | Hanson | Oct. 11, 1938 |
| 2,161,907 | Barr et al. | June 13, 1939 |
| 2,227,832 | Herold | Jan. 7, 1941 |
| 2,236,281 | Anderson | Mar. 25, 1941 |
| 2,360,874 | Herold | Oct. 24, 1944 |